B. W. REMY.
COMBINED SEEDER AND CULTIVATOR.

No. 66,627. Patented July 9, 1867.

Witnesses:

Inventor:
B. W. Remy.
By atty A. B. Stoughton.

United States Patent Office.

B. W. REMY, OF BROOKVILLE, INDIANA.

Letters Patent No. 66,627, dated July 9, 1867.

---

IMPROVEMENT IN COMBINED SEEDER AND CULTIVATOR.

---

The Schedule referred to in these Letters Patent and making part of the same.

---

TO ALL WHOM IT MAY CONCERN:

Be it known that I, B. W. REMY, of Brookville, in the county of Franklin, and State of Indiana, have invented certain new and useful Improvements in Combined or Convertible Seed-Planters and Cultivators; and I do hereby declare the following to be a full, clear, and exact description of the same, reference being had to the accompanying drawings, making a part of this specification, in which—

Figure 2 represents a rear elevation of the same

Figure 3 represents a side view of a seeding or planting apparatus that may be attached when the cultivating ploughs are removed, or *vice versa*.

Similar letters of reference, where they occur in the separate figures, denote like parts of the machine in all the drawings.

Figure 1:
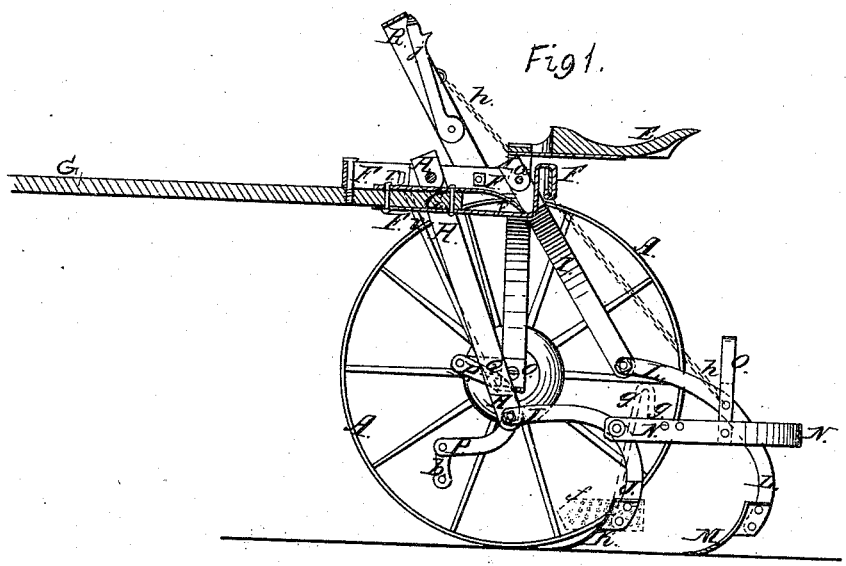
Figure 1 represents a sectional side elevation of the machine.
Figure 1:
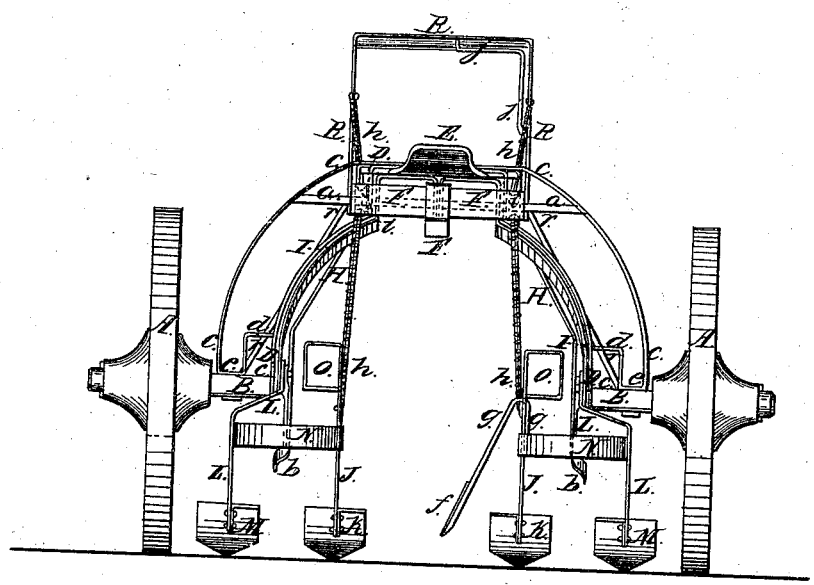
Figure 1:
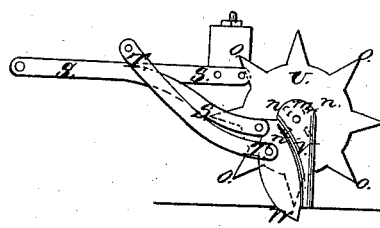

My invention relates to a combined or convertible seed-planter and cultivator, made mainly of bar iron or steel, and without much if any upsetting, the bars, links, or straps being only bent, punched, and riveted together, or to the axle, journals, or frame. The machine is very strong and durable; quite light, as compared with machines of anything like its endurance made of wood, and the parts flexible, or yielding to the inequalities of the ground or any intervening obstacle in its path. It is of quite light draught, and very readily changed from a seed-planter to a cultivator, and *vice versa*.

To enable others skilled in the art to make and use my invention, I will proceed to describe the same with reference to the drawings.

A A are a pair of supporting wheels for carrying the machine and the driver or conductor mounted upon it. B B are short axles supported in the wheels, and which are connected by two arched bars, C D, which are united together at their tops or crowns, and the same rivets that unite these two arched pieces also secure or fasten to them the driver's or conductor's seat E, which projects rearward from its points of attachment to cause the weight of the driver to aid in balancing the machine. F is a tongue-frame substantially connected with the arched pieces C D by means of a through bolt or rod $a$, and the tongue G is attached to this tongue-frame, and the whole constitutes a main frame carried by the wheels A A. To the main frame are pivoted two bent bars, H I, that can freely move on their pivoted connections. To the lower end of the bar H there is pivoted a beam, J, that carries a plough or cultivator, K, and to the lower end of the bar I there is pivoted a beam, L, that carries a plough or cultivator, M, and these two beams, J L, are connected by a bent bar, N, riveted or pivoted to both, and in said bent bar N there is a stirrup, O, for the driver or conductor to place his foot in. Where the bar H is pivoted to its beam, J, there is also pivoted a curved link, P, the one end of which is pivoted to an arm, Q, that is in turn pivoted to one of the short axles B, and to the other or free end there is pivoted a link or strap, $b$, to which one of the horses of the team is hitched. When the driver or occupant of the seat does not desire to place his feet in the stirrups O O, to press down or relieve one or both of the sets of ploughs, he can place and rest them at $c$, $d$ or $e$, which are on the axles. I have mentioned how one set or pair of ploughs is hung and operated on one side of the machine. The opposite set or pair is hung and operated in the same manner, though the two sets are hinged to the main frame independently of each other. For some purposes an oblique mould-board may be required to throw the earth towards the plants. I have shown one such at $f$, which is secured to or near one of the ploughs, K, by a bent arm, $g$, which fits into a socket on the beam J. A similar mould-board may be used and applied to the opposite beam, so as to throw up the soil on both sides of the row which the ploughs straddle. To the main frame there is pivoted a lifting-frame, R, to which chains or ropes $h$ $h$ are fastened, and which, after passing over the pulleys $i$ $i$ in the main frame, are attached respectively to the stirrup-rods, which in turn are attached to the beams J J, and as the beams J are attached to their mates or fellows L, by means of the bent bars N, the operating of the lifting-frame, through its chains $h$ $h$, will raise up or let down the ploughs together. On this lifting-frame R there is a pivoted catch, $j$, which, when it is desirable to raise up and hold up the ploughs, as when moving from place to place or from field to field, or when turning around at the ends of the rows, is braced with its notched end against the main frame, and thus the ploughs and their several connected parts are raised and held up and carried on the main frame high enough not to be touched by any ordinary obstacle. That I may use this same frame, carrying-wheels, and pivoted bars H I for the machine when converted into a seed-planting or dropping machine, I unite the plough-beams J L and their connecting-piece N to these pivoted bars by screw-bolts or otherwise, so that they may be readily taken off, and to the same bolt holes and by the same bolts I attach a seed-planter or dropper, (fig. 3,) by the straps or bars S T thereon, so that the machine may be converted in a few minutes from a cultivator to a planter, and *vice versa*. The seed-dropper may be composed of star-wheels U, (one on each side of the machine, so as to plant two rows at once, but one only seen in the side view,) hung upon short axles, with which they revolve, supported on the ends of the pivoted bars S T. Upon these axles there are wheels, $m$, that have a series of cells $n$ in them capable of holding a regulated quantity of grain, which they may receive or take from any ordinary hopper placed over or around them. As these seeding-wheels $m$ revolve, their cells empty their contents into a seeding tube, V, which has a furrow-opener, W, in advance of it at its lower end, and which opens a furrow for the seed to drop into. As the machine is advanced over the ground by the team, the points $o$ of the star-wheels U enter the ground, and are, by the forward motion of the machine, forced to turn around, and with them turn the axles and the seeding-wheels $m$ on them. This seeding apparatus can rise and fall, to accommodate itself to the ground over which it is working, or be raised and held up, as in the case of the cultivating-ploughs. There are also iron rods $r$ $r$ that support, brace, and connect the forward part of the frame F with the short axles B.

Having thus fully described my invention, what I claim therein as new, and desire to secure by Letters Patent, is—

1. The main frame, composed of the vertical arched iron bars C D and the horizontal frame F, also made of iron bars, and the whole combined with the short axles B B, by which it is supported in the carrying-wheels, substantially as and for the purpose described.

2. I also claim, in combination with the main frame, composed of iron bars or straps, and supported as described, the pivoted bars H I, to which a cultivating or seeding mechanism substantially such as described and represented may be attached, as and for the purpose set forth.

B. W. REMY.

Witnesses:
ROBERT LOCK,
W. P. STALCUP.